United States Patent
Deshpande

(10) Patent No.: US 10,114,748 B2
(45) Date of Patent: Oct. 30, 2018

(54) DISTRIBUTED RESERVATION BASED COHERENCY PROTOCOL

(71) Applicant: Freescale Semiconductor, Inc., Austin, TX (US)

(72) Inventor: Sanjay R. Deshpande, Austin, TX (US)

(73) Assignee: NXP USA, Inc., Austin, TX (US)

(*) Notice: Subject to any disclaimer, the term of this patent is extended or adjusted under 35 U.S.C. 154(b) by 42 days.

(21) Appl. No.: 15/280,383

(22) Filed: Sep. 29, 2016

(65) Prior Publication Data

US 2018/0089083 A1 Mar. 29, 2018

(51) Int. Cl.
G06F 12/0831 (2016.01)
G06F 12/0817 (2016.01)

(52) U.S. Cl.
CPC ...... G06F 12/0831 (2013.01); G06F 12/0828 (2013.01); G06F 2212/621 (2013.01)

(58) Field of Classification Search
CPC ............. G06F 12/0831; G06F 12/0828; G06F 12/0806; G06F 12/0815; G06F 12/0817; G06F 12/0822; G06F 2212/621
See application file for complete search history.

(56) References Cited

U.S. PATENT DOCUMENTS

| | | | |
|---|---|---|---|
| 6,073,211 A * | 6/2000 | Cheng | G06F 9/52 711/117 |
| 6,625,701 B1 | 9/2003 | Arimilli et al. | |
| 6,629,214 B1 | 9/2003 | Arimilli et al. | |
| 7,089,373 B2 | 8/2006 | Day et al. | |
| 9,026,742 B2 | 5/2015 | Deshpande et al. | |
| 2008/0162823 A1 | 7/2008 | Day et al. | |
| 2014/0052921 A1* | 2/2014 | Biles | G06F 9/3834 711/125 |

OTHER PUBLICATIONS

Freescale Semiconductor, "e300 Power Architecture™ Core Family Reference Manual," e300CORERM Rev. 4, Dec. 2007, 422 pages.
Freescale Semiconductor, "Application Note Multiprocessor Systems and the PowerPC 603e™ Microprocessor," AN1294/D, 2004, 5 pages.
Segal, G and Smith, D., "PowerQUICC™ Data Cache Coherency," AN3544, Rev. 0, Dec. 2007, 12 pages.
Hennessy, J., and Patterson, D., "Computer Architecture a Quantitative Approach," Morgan Kaufmann Publishers, Inc., 1990, 1996, 2003 by Elsevier Science (USA), pp. 549-560.

* cited by examiner

Primary Examiner — Michael Krofcheck

(57) ABSTRACT

A method of operating a cache-coherent computing system includes storing first state information corresponding to a first reservation for a first exclusive access to a first memory address requested by a first thread executing on a first processor of a first plurality of processors. The method includes transmitting an output atomic response transaction indicating a status of the first reservation to a coherency interconnection in response to issuance of the first exclusive access to the coherency interconnection. The output atomic response transaction is based on first state information.

20 Claims, 3 Drawing Sheets

DISTRIBUTED RESERVATION BASED COHERENCY PROTOCOL

CROSS-REFERENCE TO RELATED APPLICATION(S)

This application claims the benefit under 35 U.S.C. § 119(e) of U.S. Provisional Application No. 62/285,034, filed Sep. 27, 2016, entitled "DISTRIBUTED RESERVATION BASED COHERENCY PROTOCOL," naming Sanjay R. Deshpande as inventor.

BACKGROUND

Field of the Invention

This invention relates to processing systems and, more particularly, to memory coherence in processing systems.

Description of the Related Art

In general, shared memory multi-processor systems implement cache coherency using processor hardware that determines whether a memory request target location resides in the processor cache and takes appropriate actions to ensure coherency. Processor logic (e.g., cache logic) snoops (i.e., examines) transactions on a system bus to identify transactions requiring coherency actions. Exemplary bus signals associated with snooping include global signals, which are driven by the processor to indicate shared memory, and signals driven by the cache logic that indicate data to flush. Cache coherency logic may use mutual exclusion during execution of critical sections of code. Techniques for acquiring locks or semaphores control access to memory resources by multiple processes. Cache coherent systems including cores with load-store architectures use reservation of semaphore address techniques to atomically update memory locations. Under certain circumstances, these locking techniques are susceptible to live-locks, i.e., scenarios under which no progress in terms of acquiring a lock can be made. Accordingly, improved reservation-based locking techniques are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

A distributed and scalable reservation-based locking protocol includes coupling each processor cluster to a coherency interconnection using a corresponding coherence interface. Each coherence interface maintains status information for each exclusive transaction issued by the corresponding processor cluster. Each coherence interface communicates atomic response transactions to the coherency interconnection based on the status information. Each coherence interface filters the corresponding processor cluster from colliding snoops and colliding exclusive transactions according to status information received in atomic response transactions. The distributed nature of the filtering reduces likelihood of memory transaction bottlenecks. The reservation-based locking protocol is scalable to any number of processor clusters reducing system redesign due to changes to system size. The distributed and scalable reservation-based locking protocol reduces or eliminates the likelihood of live-lock conditions due to zombie transactions invalidating reservations of valid transactions.

Figure 1:
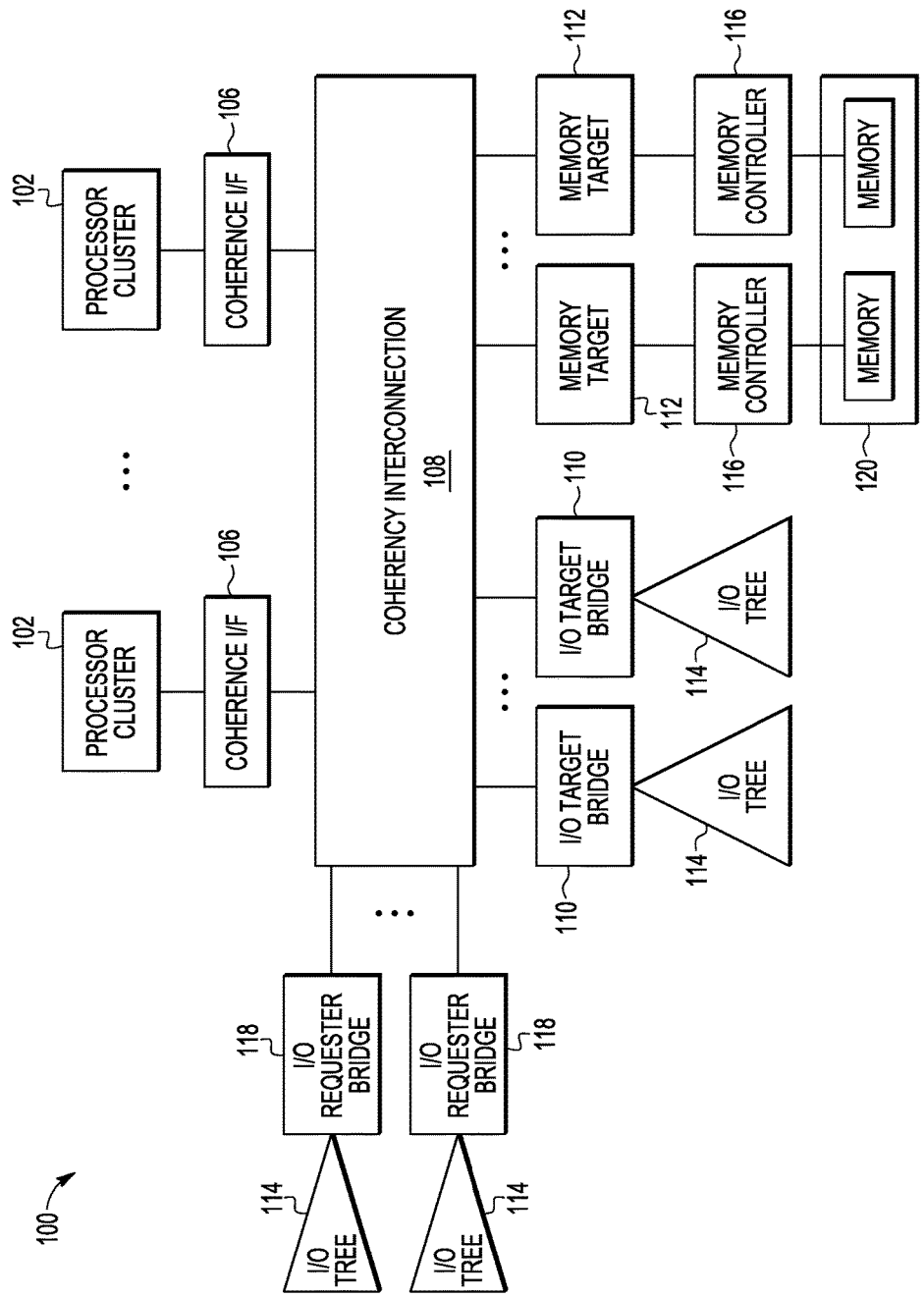
FIG. 1 illustrates a functional block diagram of an exemplary distributed and scalable reservation-based cache-coherent multiprocessor computing system.

Referring to FIG. 1, an exemplary parallel processing system shares memory resources and implements the distributed and scalable reservation-based locking protocol to maintain cache coherency. Each processor cluster 102 includes multiple processing cores incorporated into a system that includes one or more caches and one or more cache controllers. Each cache controller may include coherency logic for the thread, processor, or processor cluster that issues memory transactions to coherency interconnection 108 and monitors a shared bus implemented by coherency interconnection 108. In at least one embodiment of system 100, processor clusters 102 implement a first transaction protocol defined by a first vendor, coherency interconnection 108 implements a second protocol defined by a second vendor, and coherence interfaces 106 translate transactions and responses between the first and second transaction protocols for communication with the shared memory system coupled to memory controllers 116 via memory targets 112. System 100 may include additional clients that share the memory resources but use a non-coherent protocol. For example, peripherals or I/O devices in I/O trees 114 may communicate non-coherent transactions to coherency interconnection 108 using a corresponding I/O requester bridge 118 or a corresponding I/O target bridge 110.

System 100 maintains cache coherency between caches included in each processor cluster 102 with shared memory 120 coupled to memory controllers 116 using a snooping coherency mechanism. That is, each cache that stores a copy of the data from a block of physical memory also stores a copy of the sharing status of the block, and no centralized state is maintained. Each cache may use a write-invalidate protocol to invalidate other copies on a write. For a typical write-back cache, the cache logic may implement any of several protocols for each line of data in the cache (e.g., three state modified, exclusive, invalid (MEI) protocol, or four-state modified, exclusive, shared, invalid (MESI) protocol). Exclusive access ensures that no other readable or writable copies of the memory block exist when the write occurs. All other cached copies of the item are invalidated. The transaction protocols assume operations are atomic, i.e., operations execute in a way such that no intervening operation can occur. For example, a write miss can be detected, acquire the bus in coherency interconnection 108, and receive a response in a single atomic action.

Cache controllers within processor clusters 102 monitor the shared bus in coherency interconnection 108 to determine whether or not the cluster has a copy of a block that is requested on the bus. Individual cores or individual threads executing on a core of a processor cluster 102 may reserve a block for an exclusive transaction. Each processor cluster 102 may include a local exclusive monitor that ensures correct operation of synchronization primitives for exclusive loads and stores for the executing thread, processor, or processor cluster, but that local exclusive monitor does not ensure external synchronization across processor clusters 102.

Each processor cluster 102 may use any of various cache management instructions and transactions and bus broadcasting techniques defined by the vendor of processor cluster 102 and consistent with the cache state protocol implemented by the processor cache. Exemplary bus operations are based on the memory transaction type (e.g., read with reservation transaction, conditional store transaction, exclusive store transaction, or other instruction semaphore operation), current state (e.g., modified, exclusive, shared, or invalid) of a block in the cache, and determine a next state (e.g., modified, exclusive, shared, or invalid) of the block in the cache. While only one reservation may exist per processor or thread executing on a processor, more than one processor in the multiprocessor system can reserve a target memory block.

Processor clusters 102 may implement a load/store architecture that includes exclusive instructions, e.g., load with reservation instruction or exclusive load register instructions. An exemplary exclusive load register instruction loads a processor register with data from an addressed memory location and initializes a state of an exclusive monitor (i.e., reservation) for that memory location to track the synchronization operation for exclusive access. A subsequent store to that memory location clears the reservation. The reservation is a monitor for the memory address. The system watches for a store to that memory address. In response to the cache hierarchy of the processor or processor cluster 102 being unable to fulfill a load with reservation or exclusive load register instruction, the processor or processor cluster 102 issues a read with reservation transaction to coherency interconnection 108. In response to the cache hierarchy of the processor or processor cluster 102 being unable to fulfill a store instruction or store exclusive instruction, the processor or processor cluster 102 issues a store conditional or store exclusive transaction to coherency interconnection 108.

For example, an exclusive store data from register instruction stores from a register to an addressed memory location and returns a value indicating whether the addressed location was reserved for the exclusive access. If the addressed location was not reserved, the store is not executed and contents of the memory are unchanged. The reservation is cleared whether or not the operation succeeded. The conditional store succeeds only if the reservation is valid at the time of the store. Likewise, a store conditional or store exclusive transaction succeeds only if the reservation is valid at the time of execution of the transaction. If the store conditional or store exclusive transaction does not succeed, processor cluster 102 sends a reservation lost indicator to coherency interconnection 108. The exclusive store from register instruction may perform a conditional store of a word to memory. If the exclusive monitor(s) permits the store and a store conditional transaction that might have been generated for that store, the operation updates contents of the memory location and returns a first value (e.g., '0') in a destination register, indicating that the operation succeeded. If the exclusive monitor(s) does not permit the store and the store conditional transaction that might have been generated for that store, the operation does not update the memory location and returns a second value (e.g., '1') in the destination register. This makes it possible to implement conditional execution paths based on the success or failure of a memory operation. If two independent memory clients request write transactions to the same memory location, memory controller 116 chooses one transaction to succeed (e.g., the first transaction for the memory address in a queue of transactions that are serialized in the memory controller). All other subsequent transactions to that memory address already in the queue are colliding transactions that are invalidated and lose their reservations, i.e., become zombie transactions.

A zombie transaction is an unsuccessful exclusive write transaction having a reservation to a target memory address that follows another, earlier, successfully executed transaction (a conditional or unconditional transaction) to the target memory address. The success of the earlier transaction causes the subsequent, colliding transaction (i.e., a subsequent exclusive write transaction caused by a conditional write instruction) that was issued before the successful execution of the earlier transaction to kill or lose its reservation to the memory address. A subsequent transaction to the same memory address is a valid transaction to that memory address if the subsequent transaction is issued to the coherency interconnection after the success of the earlier transaction to that target memory address. Live-lock may occur when a zombie transaction to a target memory address kills a reservation for a valid transaction to the target memory address.

Figure 2:
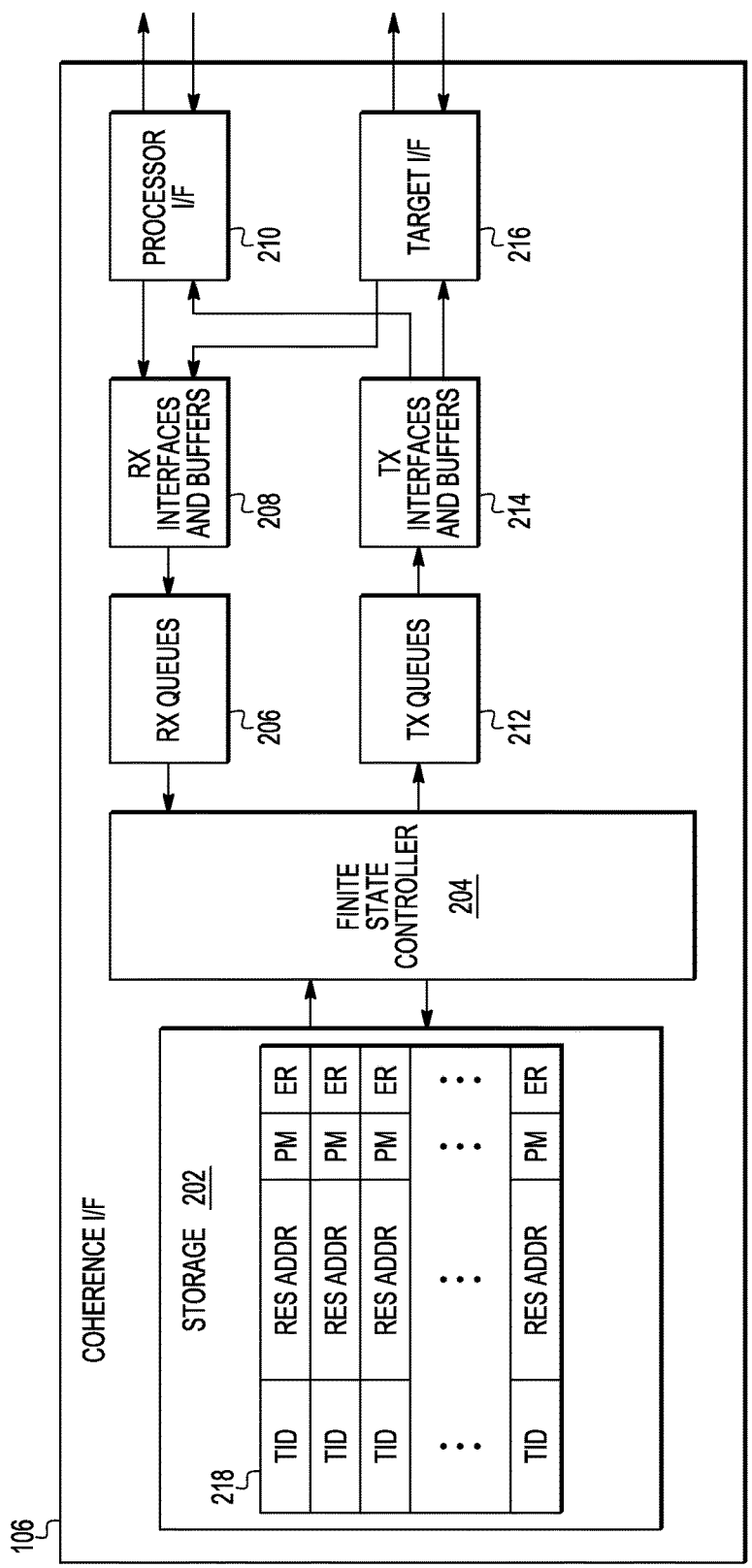
FIG. 2 illustrates a functional block diagram of an exemplary coherence interface of the multiprocessor computing system of FIG. 1.

Coherence interface 106 is coupled between a corresponding processor cluster 102 and coherency interconnection 108. Coherence interface 106 filters snoops and transactions and only forwards valid snoops or transactions to the corresponding processor cluster 102. Any invalid snoops or transactions are not forwarded to processor cluster 102, thereby preventing zombie transactions from killing valid reservations and invalidating valid transactions. Thus, coherency interface 106 reduces the likelihood of live-lock conditions. Referring to FIG. 2, an exemplary coherence interface includes storage 202, which stores state information 218 for reservations of transactions issued by the corresponding processor cluster 102. In at least one embodiment, state information 218 includes a transaction identifier (which may identify an issuing thread or processor core), a reservation address, a proxy monitor, and an exclusive-write-ready indicator. State information 218 is used to monitor memory address reservations and detect success of atomic accesses made by a corresponding core or thread. Finite state controller 204 updates the state information based on transactions, snoops, and specialized (e.g., atomic response transaction) signals transmitted and received using receive queues 206, receive interfaces and buffers 208, transmit queues 212, transmit interfaces and buffers 214, processor interface 210, and target interface 216, as described further below. Note that the structure of coherence interface 106 is exemplary only and other architectures may be used to transmit and receive transactions, snoops, responses, and atomic response transactions consistent with the description herein.

Figure 3:
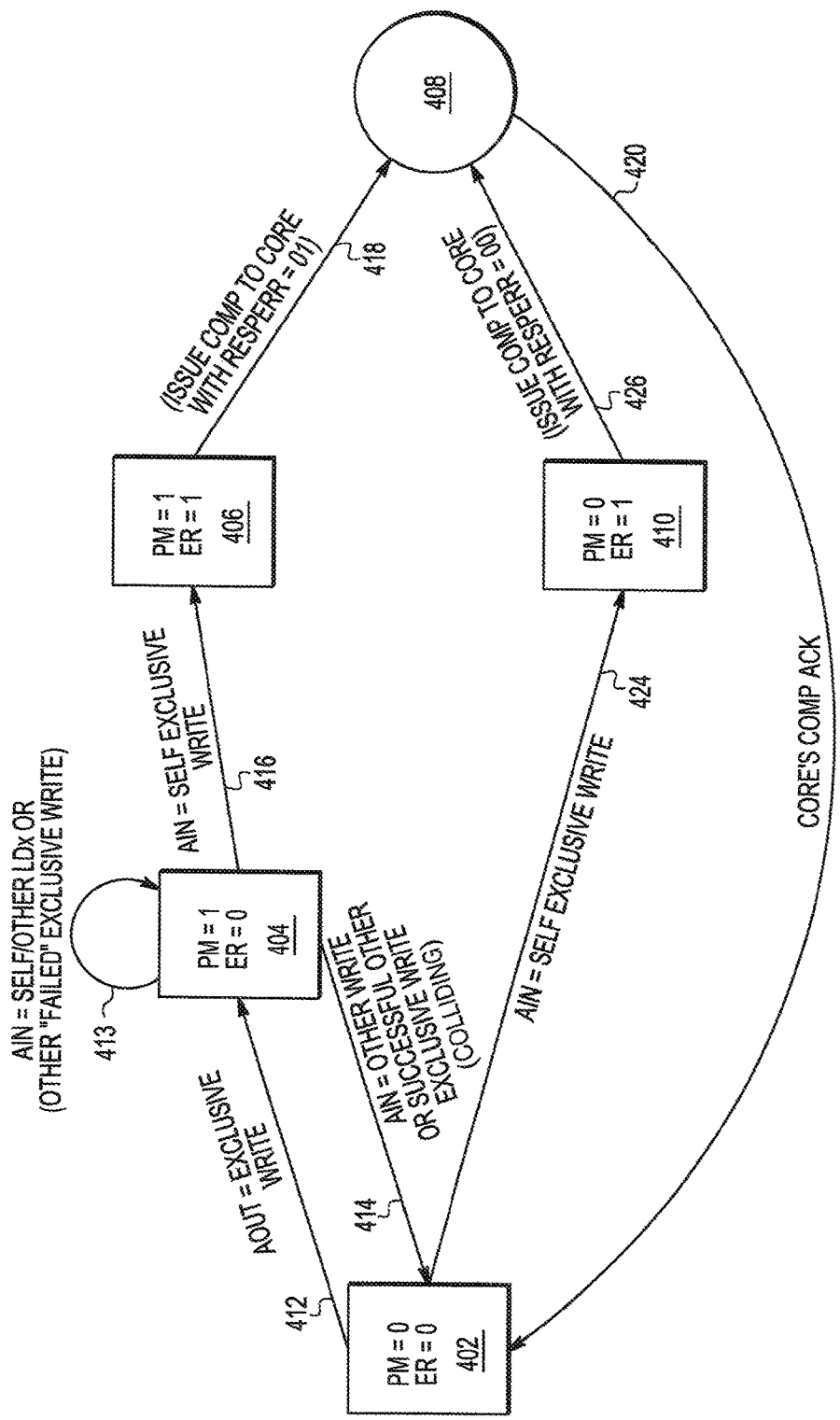
FIG. 3 illustrates a state diagram for an exemplary coherence interface of FIG. 2.

Referring to FIGS. 1-3, in at least one embodiment of system 100, in response to issuing an exclusive read transaction to coherence interface 106, the associated processor core within processor cluster 102 sets a reservation for the target memory address and coherence interface 106 generates an entry in storage 202 including a transaction identifier, which may include a thread or processor core identifier, the reservation memory address, proxy monitor state (e.g., having a reset value), and exclusive-write-ready state (e.g., having a reset value) (402). In response to the associated processor core or thread issuing an exclusive store transaction (412), finite state controller 204 sets the proxy monitor state (404). While the proxy monitor state is set (404), coherence interface 106 prevents other colliding exclusive stores from snooping the associated memory address in a cache of processor cluster 102 until coherence interface 106 receives an atomic response transaction from a coherence interface 106 that is associated with a client of colliding transaction (413).

Coherence interface 106 issues atomic response transactions for atomic exclusive write transactions to coherency interconnection 108 and receives atomic response transactions for atomic exclusive write transactions from coherency interconnection 108. Exemplary atomic response transactions include a set of fields that indicate a unique identifier for the associated transaction, a failure status that is set only by the originating coherence interface 106 for the transaction based on a corresponding proxy monitor state for the transaction, or other information. These atomic response transactions are broadcast to all coherence interfaces 106 of processor clusters that have a reservation to the associated memory address. The coherence interface 106 that is associated with the identified transaction will combine failure status bits in any corresponding atomic response transactions to determine whether the referenced transaction is a failed, zombie transaction (e.g., by a logical OR of the failure status indicators). If the atomic response transaction indicates that the colliding transaction has failed, coherence interface 106 discards the colliding transaction without snooping processor cluster 102 and coherence interface 106 may issue a default output response. However, if the atomic response transaction indicates that the colliding transaction is successful (414), finite state controller 204 resets the proxy monitor bit (402) and the colliding transaction or snoop is forwarded to snoop processor cluster 102.

If the proxy monitor state is set and exclusive-write-ready state is reset (402), and coherence interface 106 detects the associated exclusive write transaction on the system bus or detects other failed exclusive writes to the target address (413), finite state controller 204 maintains the proxy monitor state and the exclusive-write-ready state (404). If the proxy monitor state is set and exclusive-write-ready state is reset (404), and coherence interface 106 detects the transaction being issued by the coherence interface 106 being selected to execute (416), finite state controller 204 maintains the proxy monitor state and sets the exclusive-write-ready state (406). While the exclusive-write-ready state is set, coherence interface 106 prevents other colliding snoops from snooping processor cluster 102 until the exclusive-write-ready state is reset. In response to receiving a completion transaction from coherency interconnection 108, coherence interface 106 issues the completion transaction with a response error indicator set to the thread or processor core associated with the transaction (418). The processor core or thread sends a completion acknowledgement to coherence interface 106 (420) and then, finite state controller 204 resets the proxy monitor state and the exclusive-write-ready state for the reservation (402).

If, for a particular reservation, the proxy monitor state is reset and exclusive-write-ready state is reset (402), and coherence interface 106 detects the transaction being issued by the coherence interface 106 being selected for execution (424), finite state controller 204 maintains the proxy monitor state and sets the exclusive-write-ready state (410). While the exclusive-write-ready state is set, coherence interface 106 prevents other colliding snoops from snooping processor cluster 102 until the exclusive-write-ready state is reset. In response to receiving a completion transaction from coherency interconnection 108, coherence interface 106 issues to the thread or processor core associated with the transaction the completion transaction with a response error indicator reset (426). The processor core or thread of processor cluster 102 (408) sends a completion acknowledgement to coherence interface 106 (420) and then, finite state controller 204 resets the exclusive-write-ready state for the reservation (402).

In at least one embodiment, a method of operating a cache-coherent computing system includes storing first state information corresponding to a first reservation for a first exclusive access to a first memory address requested by a first thread executing on a first processor of a first plurality of processors. The method includes transmitting an output atomic response transaction indicating a status of the first reservation to a coherency interconnection in response to issuance of the first exclusive access to the coherency interconnection. The output atomic response transaction is based on first state information for the first exclusive access. The first exclusive access is requested by a first thread executing on a first processor of a first plurality of processors and being associated with a first reservation. The method may include selectively forwarding to the first plurality of processors, a colliding exclusive access of the first memory address associated with a second reservation. The second reservation corresponds to a second exclusive access to the first memory address. The colliding exclusive access is selectively forwarded to the first plurality of processors according to status information included in at least one input atomic response transaction associated with a memory requestor other than the first plurality of processors. The method may include receiving an input atomic response transaction for each corresponding reservation to the first memory address. The input atomic response transaction may include state information for the corresponding reservation. The method may include updating the status of the first reservation based on the state information in the input atomic response transaction. The method may include updating the first state information based on a status of a second reservation of second exclusive access to the first memory address. The second exclusive access may be associated with another thread executing on a second processor of a second plurality of processors. The first state information may include a proxy monitor indicator. The method may include setting the proxy monitor indicator in response to the first exclusive access being a coherent access transaction and issuance of the first exclusive access by the first processor to the coherency interconnection. The method may include resetting the proxy monitor indicator in response to indication of a successful exclusive access to the first memory address. The corresponding state information may include an exclusive-write-ready indicator. The method may include setting the exclusive-write-ready indicator in response to receiving indication of performance of the first exclusive access from the coherency interconnection. The corresponding state information may include an exclusive-write-ready indicator. The method may include selectively forwarding a colliding snoop of the first memory address to the first plurality of processors according to the exclusive-write-ready indicator. The corresponding state information may include an exclusive-write-ready indicator. The method may include resetting the exclusive-write-ready indicator in response to receiving an indication of completion of the first exclusive access. The method may include storing the first state information corresponding to the first reservation for the first exclusive access.

In at least one embodiment, a computing system includes a first plurality of processors and a coherence interface coupled to the first plurality of processors. The coherence interface includes coherence interface storage configured to store first state information corresponding to a first reservation for a first exclusive access to a first memory address requested by a first thread executing on a first processor of the first plurality of processors. The coherence interface includes a coherence interface state controller configured to communicate an atomic response transaction indicating a status of the first exclusive access to a coherency interconnection. The atomic response transaction is based on the first state information. The coherence interface may be configured to selectively forward to the first plurality of processors, a colliding exclusive access of the first memory address associated with a second reservation. The second reservation may correspond to a second exclusive access to the first memory address. The colliding exclusive access is selectively forwarded by the coherence interface according to status information included in at least one input atomic response transaction received from the coherency interconnection.

The coherence interface state controller may be further configured to update the first state information based on a status of a second exclusive access to the first memory address. The second exclusive access may be associated with another thread executing on a second processor of a second plurality of processors corresponding to a second coherence interface. The first state information may include a proxy monitor indicator. The coherence interface state controller may be configured to set the proxy monitor indicator in response to the first exclusive access being a coherent access transaction and issuance of the first exclusive access by the first processor to the coherency interconnection. The coherence interface state controller may be configured to reset the proxy monitor indicator in response to successful write to the first memory address. The first state information may include an exclusive-write-ready indicator. The coherence interface state controller may be configured to set the exclusive-write-ready indicator in response to the coherence interface state controller receiving indication of performance of the first exclusive access from the coherency interconnection. The coherence interface may be configured to selectively forward a colliding snoop of the first memory address received from the coherency interconnection to the plurality of processors according to a status of the exclusive-write-ready indicator. The first state information may include an exclusive-write-ready indicator. The coherence interface state controller may be configured to reset the exclusive-write-ready indicator in response to receiving an indication of completion of the first exclusive access. The computing system may include a memory, a memory controller coupled to the memory, and the coherency interconnection coupled to the coherence interface and the memory controller. The coherency interconnection may be configured to issue to the memory controller a selected exclusive access to the memory.

Thus, a distributed and scalable reservation-based locking protocol has been described that reduces or eliminates occurrences of live-locks. Although the invention is described herein with reference to specific embodiments, various modifications and changes can be made without departing from the scope of the present invention as set forth in the claims below. For example, while the invention has been described in an embodiment in which exclusive read and store transactions are described, one of skill in the art will appreciate that the teachings herein can be utilized with other types of memory transactions. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a cache-coherent computing system comprising:
   storing first state information corresponding to a first reservation for a first exclusive access to a first memory address requested by a first thread executing on a first processor of a first plurality of processors, the first state information including a proxy monitor indicator and an exclusive-write-ready indicator;
   maintaining a set state of the proxy monitor indicator and a reset state of the exclusive-write-ready indicator until receiving an atomic response transaction associated with a successful colliding access of the first memory address or until detecting selection for issuance of the first exclusive access; and
   transmitting an output atomic response transaction indicating a status of the first reservation to a coherency interconnection in response to issuance of the first exclusive access to the coherency interconnection,
   wherein the output atomic response transaction is based on the first state information.

2. The method, as recited in claim 1, further comprising:
   selectively forwarding to the first plurality of processors, a colliding exclusive access of the first memory address associated with a second reservation,
   wherein the second reservation corresponds to a second exclusive access to the first memory address,
   wherein the colliding exclusive access is selectively forwarded to the first plurality of processors according to status information included in at least one input atomic response transaction associated with a memory requestor other than the first plurality of processors.

3. The method, as recited in claim 1, further comprising:
   receiving an input atomic response transaction for each corresponding reservation to the first memory address, the input atomic response transaction including state information for the corresponding reservation; and
   updating the status of the first reservation based on the state information in the input atomic response transaction.

4. The method, as recited in claim 1, further comprising:
   updating the first state information based on a status of a second reservation of a second exclusive access to the first memory address,
   wherein the second exclusive access is associated with another thread executing on a second processor of a second plurality of processors.

5. The method, as recited in claim 1, further comprising:
   setting the proxy monitor indicator in response to the first exclusive access being a coherent access transaction and issuance of the first exclusive access by the first processor to the coherency interconnection.

6. The method, as recited in claim 5, further comprising:
resetting the proxy monitor indicator in response to an indication of a successful exclusive access to the first memory address.

7. The method, as recited in claim 1, further comprising:
setting the exclusive-write-ready indicator in response to receiving an indication of performance of the first exclusive access from the coherency interconnection.

8. The method, as recited in claim 1, further comprising:
selectively forwarding a colliding snoop of the first memory address to the first plurality of processors according to the exclusive-write-ready indicator.

9. The method, as recited in claim 1, further comprising:
resetting the exclusive-write-ready indicator in response to receiving an indication of completion of the first exclusive access.

10. The method, as recited in claim 1, wherein the maintaining prevents a first subsequent exclusive access to the first memory address from invalidating a second reservation for a second subsequent exclusive access to the first memory address, the first subsequent exclusive access being issued prior to success of the first exclusive access and the second subsequent exclusive access being issued after success of the first exclusive access.

11. A computing system comprising:
a first plurality of processors; and
a coherence interface coupled to the first plurality of processors, the coherence interface comprising:
coherence interface storage configured to store first state information corresponding to a first reservation for a first exclusive access to a first memory address requested by a first thread executing on a first processor of the first plurality of processors, the first state information including a proxy monitor indicator and an exclusive-write-ready indicator; and
a coherence interface state controller configured to maintain a set state of the proxy monitor indicator and a reset state of the exclusive-write-ready indicator until receiving an atomic response transaction associated with a successful colliding access of the first memory address or until detecting selection for issuance of the first exclusive access, and configured to communicate an atomic response transaction indicating a status of the first exclusive access to a coherency interconnection,
wherein the atomic response transaction is based on the first state information.

12. The computing system, as recited in claim 11,
wherein the coherence interface is configured to selectively forward to the first plurality of processors, a colliding exclusive access of the first memory address associated with a second reservation,
wherein the second reservation corresponds to a second exclusive access to the first memory address, and
wherein the colliding exclusive access is selectively forwarded by the coherence interface according to status information included in at least one input atomic response transaction received from the coherency interconnection.

13. The computing system, as recited in claim 11,
wherein the coherence interface state controller is further configured to update the first state information based on a status of a second exclusive access to the first memory address, and wherein the second exclusive access is associated with another thread executing on a second processor of a second plurality of processors corresponding to a second coherence interface.

14. The computing system, as recited in claim 11,
wherein the coherence interface state controller is configured to set the proxy monitor indicator in response to the first exclusive access being a coherent access transaction and issuance of the first exclusive access by the first processor to the coherency interconnection.

15. The computing system, as recited in claim 14, wherein the coherence interface state controller is configured to reset the proxy monitor indicator in response to a successful write to the first memory address.

16. The computing system, as recited in claim 11,
wherein the coherence interface state controller is configured to set the exclusive-write-ready indicator in response to the coherence interface state controller receiving an indication of performance of the first exclusive access from the coherency interconnection.

17. The computing system, as recited in claim 16,
wherein the coherence interface is configured to selectively forward a colliding snoop of the first memory address received from the coherency interconnection to the first plurality of processors according to a status of the exclusive-write-ready indicator.

18. The computing system, as recited in claim 16,
wherein the coherence interface state controller is configured to reset the exclusive-write-ready indicator in response to receiving an indication of completion of the first exclusive access.

19. The computing system, as recited in claim 11, further comprising:
a memory;
a memory controller coupled to the memory; and
the coherency interconnection coupled to the coherence interface and the memory controller, the coherency interconnection being configured to issue to the memory controller a selected exclusive access to the memory.

20. An apparatus comprising:
a plurality of processors configured to request exclusive access to a memory;
means for storing first state information corresponding to a first reservation for a first exclusive access to a first memory address of the memory requested by a first thread executing on a first processor of the plurality of processors corresponding to the means for storing, the first state information including a proxy monitor indicator and an exclusive-write-ready indicator; and
means for selectively providing to the plurality of processors, a colliding exclusive access of the first memory address associated with a second reservation for a second exclusive access to the first memory address according to status information for the second reservation included in at least one input atomic response transaction received from a coherency interconnection,
wherein the means for selectively providing prevents an intervening exclusive access to the first memory address from invalidating the second exclusive access, the intervening exclusive access being issued prior to success of the first exclusive access, and the second exclusive access being issued after success of the first exclusive access.

* * * * *